United States Patent
Chan et al.

(10) Patent No.: US 7,489,872 B2
(45) Date of Patent: Feb. 10, 2009

(54) OPTICAL FIBER SYSTEM AND METHOD FOR CARRYING BOTH CATV AND ETHERNET SIGNALS

(75) Inventors: Yi-Jen Chan, Jhongli (TW); Fan-Hsiu Huang, Jhongli (TW); Hsin-Pin Wang, Jhongli (TW); Dong-Ming Lin, Jhongli (TW); Mu-Tao Chu, Jhongli (TW); Shin-Ge Lee, Jhongli (TW); Shun-Tien Lee, Jhongli (TW)

(73) Assignee: National Central University, Taoyuan (TW)

( * ) Notice: Subject to any disclaimer, the term of this patent is extended or adjusted under 35 U.S.C. 154(b) by 472 days.

(21) Appl. No.: 10/948,330

(22) Filed: Sep. 24, 2004

(65) Prior Publication Data

US 2006/0067698 A1   Mar. 30, 2006

(51) Int. Cl.
*H04B 10/12* (2006.01)
*H04B 10/00* (2006.01)
*H04J 14/00* (2006.01)

(52) U.S. Cl. .................... 398/141; 398/140; 398/66; 398/69; 455/39; 725/127; 725/129

(58) Field of Classification Search ............ 398/66–69, 398/70–71, 140–141; 455/3.01, 3.04, 3.06, 455/39, 43, 45, 500; 725/118, 127, 128, 725/129
See application file for complete search history.

(56) References Cited

U.S. PATENT DOCUMENTS

| | | | |
|---|---|---|---|
| 4,301,543 A * | 11/1981 | Palmer | 398/41 |
| 4,953,156 A | 8/1990 | Olshansky et al. | 370/3 |
| 5,705,960 A * | 1/1998 | Izumiyama | 333/26 |
| 5,822,102 A | 10/1998 | Bodeep et al. | 359/167 |
| 6,462,702 B1 * | 10/2002 | Bowlds | 342/104 |
| 6,529,303 B1 | 3/2003 | Rowan et al. | 359/128 |
| 6,577,414 B1 | 6/2003 | Feldman et al. | 359/125 |
| 6,850,710 B1 * | 2/2005 | Mells | 398/163 |
| 7,231,655 B2 * | 6/2007 | Brooks | 725/114 |
| 2002/0012495 A1 * | 1/2002 | Sasai et al. | 385/24 |
| 2002/0071159 A1 * | 6/2002 | Lange et al. | 359/152 |
| 2004/0219898 A1 * | 11/2004 | Bult et al. | 455/252.1 |
| 2004/0264683 A1 * | 12/2004 | Bye | 379/402 |

* cited by examiner

*Primary Examiner*—M. R. Sedighian
(74) *Attorney, Agent, or Firm*—Troxell Law Office, PLLC

(57) ABSTRACT

The present invention is an optical fiber system and method for carrying both CATV and Ethernet signals. The digital signals are translated into higher band by a direct up/down conversion so that analog signals and digital signals are treated as different frequency bands of electrical signals. Then, all the signals are mixed/divided by a power combiner/divider. And then, by using optoelectronic devices, the signals are processed with optoelectronic conversion. The converted optical signals are transmitted in a fiber or a related optical channel having low channel loss yet high capacity. To sum up, the present invention can transmit digital signals together with analog signals in a single wavelength to save the cost of an optical signal system and to provide a convenience on rearranging the system.

23 Claims, 16 Drawing Sheets

OPTICAL FIBER SYSTEM AND METHOD FOR CARRYING BOTH CATV AND ETHERNET SIGNALS

FIELD OF THE INVENTION

The present invention relates to an optical fiber system and method; more particularly, relates to, through a direct up/down signal conversion and by using filters and power combiner/divider, electrical signals with different transmitting frequencies are integrated. Then, the signals are processed with an optoelectronic conversion through an optoelectronic device. And then, the signals are transmitted through an optical fiber or a related optical channel, which is characterized in low channel loss yet high capacity. The present invention can be applied to a fiber digital network communication system, a fiber CATV (cable television) system or a passive fiber network system.

DESCRIPTION OF THE RELATED ARTS

Owing to the requirement of diversification and the requirement of a high-speed transferring rate for the network service nowadays, digital signals and analog signals can be delivered in the same channel (i.e. an optical channel) at the same time through being carried on different wavelengths made by wavelength division, or through FDM (frequency division multiplexing). Those methods include:
1. WDM (wavelength division multiplexing): This method provides enough wavelength spacing between signals of different wavelengths to avoid the interferences between the signals of different wavelengths under the same operation frequency (analog) or the same operation speed (digital) so that the digital signals can be operated on high bit-rate. This method requires more than two steady laser source, optical coupler, and optical filter; and its channel capacity depends on its optical device. So, the device is more complex and the cost is relatively higher.
2. FDM (frequency division multiplexing): This method uses different carrier frequencies to verify different signal types. But, because the bandwidth of the digital signals will become higher as their bit-rate increases, the frequency spacing between signals has to increase as well to avoid interference, which makes the frequency channel number in the whole channel decrease. Furthermore, with the help of an M-PSK (phase shift keying modulation) or a QAM (quadrature amplitude modulation) which translates bits to symbols to produce the symbol rate of the digital signals, the transference bandwidth can be decreased. But the bit-rate of the digital signals is still low and the signal process it involves is complex.

SUMMARY OF THE INVENTION

Therefore, the present invention provides an optical fiber system and method for carrying both CATV and Ethernet signal, comprising a transmitting part, a receiving part and an optical channel. In the transmitting part, signals of a first signal source 111 are transmitted to a low-pass filter 112 for transmission to be transmitted to a power combiner 13. Signals of a second signal source 121 are up-converted through a mixer 122 for transmission. Then, the signals are transmitted to a band-pass filter 123. And then, the signals are transmitted to the power combiner 13.

The signals of the first signal source 111 and the signals of the second signal source 121 are combined by the power combiner 13 to form mixed electrical signals. Then, the level and the power of the mixed electrical signals are modulated by an amplifier 14 for transmission. And, the mixed electrical signals are converted into optical signals by an electrical-to-optical converter 15, and then are transmitted in an optical channel, such as a glass fiber, a plastic fiber or a free space.

In the receiving part, the optical signals are received from the optical channel into an optical-to-electrical converter. The optical signals are converted into the original mixed electrical signals of the transmitting part by the optical-to-electrical converter 21. And, by the power divider, the mixed electrical signals are divided into signals of a third signal source 231 and signals of a fourth signal source 241. The signals of the third signal source 231 are transmitted to a low-pass filter 232 for receipt. Then, the signals of the third signal source 231 are transmitted to a signal amplifier 233 to be outputted as a first signal output. And yet, the signals of the fourth signal source 241 are transmitted to a high-pass filter 242. The high-pass filter 242 is connected to a mixer 243 for receipt so that the signals of the fourth signal source 241 are down-converted to form enveloped signals. Then, the enveloped signals are un-enveloped into non-enveloped signals through a low-pass filter 244 for un-enveloping. And then, the non-enveloped signals are amplified by a limiting amplifier 245 to be outputted as a second signal output 246.

However, the signals of the first and the second signal source can be either analog/CATV signals under a working frequency between 50 MHz and 850 MHz or digital/Ethernet signals under a bandwidth above 10 Mb/s; and, the signals from the first and the second signal outputs can be either analog/CATV signals or digital/Ethernet signals.

In the present invention, the digital signals are translated into higher band by a direct up/down conversion so that the analog signals and the digital signals are treated as different frequency bands of electronic signals. Then, all the signals are mixed/divided by a power combiner/divider. And then, by using optoelectronic devices, the signals are processed with an optoelectronic conversion. And, the converted optical signals are transmitted in a fiber or a related optical channel having low channel loss yet high capacity. So, the present invention can transmit digital signals together with analog signals in a single optical wavelength to save the cost of an optical signal system and to provide a convenience on rearranging the system. And, the present invention can be applied to a digital fiber network communication system, a fiber CATV system or a passive fiber network system.

BRIEF DESCRIPTIONS OF THE DRAWINGS

The present invention will be better understood from the following detailed description of preferred embodiments of the invention, taken in conjunction with the accompanying drawings, in which
FIG. 1 is a system diagram according to an embodiment of the present invention;
FIG. 2 is a spectrum diagram of digital/Ethernet signals at the transmitting part according to an embodiment of the present invention;
FIG. 3A is a spectrum diagram of up-converted digital/Ethernet signals before filtering according to an embodiment of the present invention;
FIG. 3B is a spectrum diagram of up-converted digital/Ethernet signals after filtering according to an embodiment of the present invention;
FIG. 4A is a view showing a Wilkinson power divider as a passive power combiner/divider according to an embodiment of the present invention;

DESCRIPTION OF THE PREFERRED EMBODIMENT

The following descriptions of the preferred embodiments are provided to understand the features and the structures of the present invention.

Figure 1:
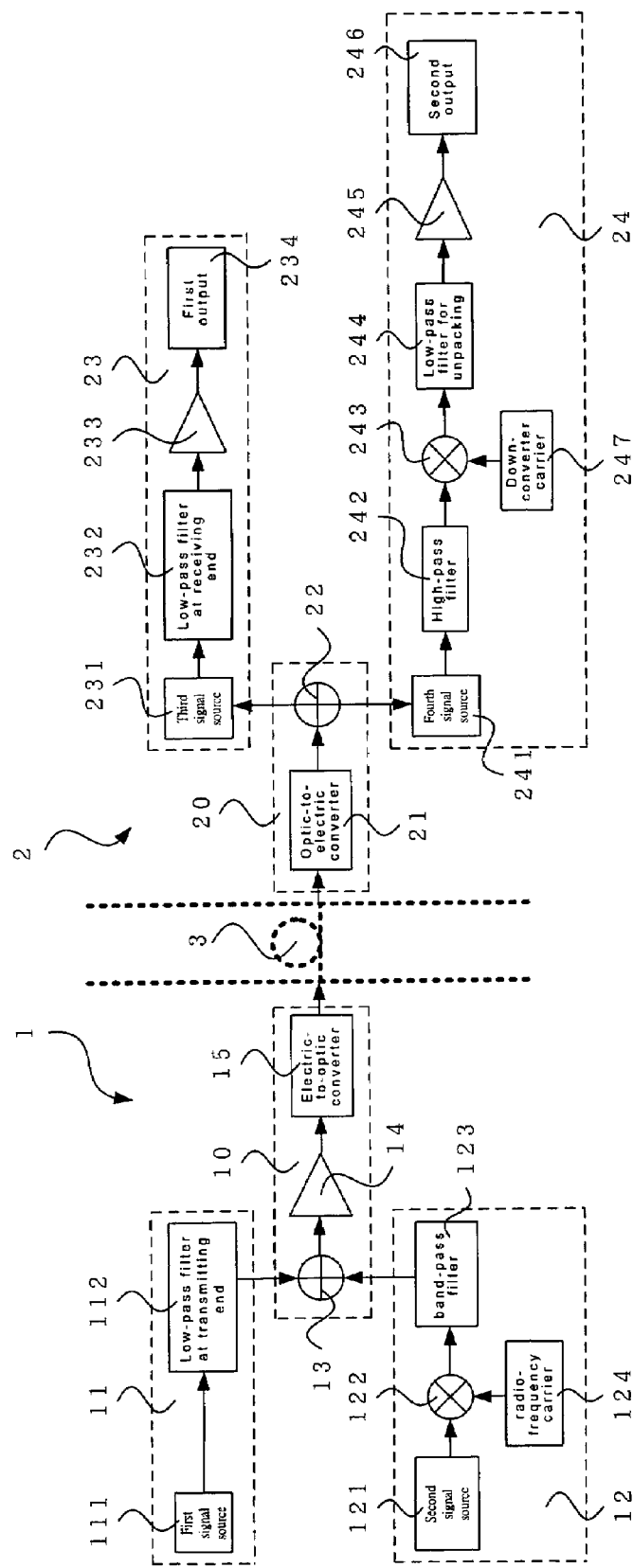

Please refer to FIG. 1, which is a system diagram according to an embodiment of the present invention. As shown in the figure, the present invention is an optical fiber system and method for carrying both CATV and Ethernet signal, comprising a transmitting part 1, a receiving part 2 and an optical channel 3, where the optical channel 3, such as a glass fiber, a plastic fiber or a free space, is a channel for transmitting signals. According to the embodiment, in a first transmitter 11 of the transmitting part 1, signals of a first signal source 111 are transmitted to a low-pass filter 112 for transmission to be transmitted to a power combiner 13. In a second transmitter 12 of the transmitting part 1, signals of a second signal source 121 are up-converted to an RF (radio frequency) band by adding an RF carrier 124 of 1.8 GHz (giga-hertz) or 2.4 GHz through a mixer 122 for transmission. Then, the signals of the second signal source 121 are transmitted to a band-pass filter 123. In order to avoid overlapping the bandwidth of the digital signals and the analog signals, the signals of the second signal source 121 are kept within a fixed RF band, and the higher/lower band power outside 0.75 times of the bit-rate is removed. And then, the signals are transmitted to the power combiner 13.

The power combiner 13 together with an amplifier 14 for transmission and an electrical-to-optical converter 15 can be assembled to form a combiner amplifier 10. The signals of the first signal source 111 and the signals of the second signal source 121 are combined by the power combiner 13 to form mixed electrical signals. Then, the level and the power of the mixed electrical signals are modulated by an amplifier 14 for transmission. And, the mixed electrical signals are converted into optical signals by an electrical-to-optical converter 15, and then are transmitted through an optical channel.

In the receiving part, the optical signals are received from the optical channel into an optical-to-electrical converter. The receiver converter 20 comprises an optical-to-electrical converter 21 and a power divider 22. The optical signals are converted into the original mixed electrical signals of the transmitting part by the optical-to-electrical converter 21. And, by the power divider, the mixed electrical signals are divided into signals of a third signal source 231 and signals of a fourth signal source 241 to be transmitted to a first receiver 23 and a second receiver 24. The signals of the third signal source 231 are transmitted to a low-pass filter 232 for receipt, to avoid the interference between the analog signals and the digital signals. Then, the signals of the third signal source 231 are transmitted to a signal amplifier 233 to be outputted as a first signal output. At the same time, in order to avoid the interference between the digital signals and the analog signals, the signals of the fourth signal source 241 are transmitted to a high-pass filter 242. The high-pass filter 242 is connected to a mixer 243 for receipt so that the signals of the fourth signal source 241 are down-converted with a down-converter carrier 247 of 1.8 GHz or 2.4 GHz to form enveloped signals. Then, the enveloped signals are un-enveloped into non-enveloped signals through a low-pass filter 244 for un-enveloping. And then, the non-enveloped signals are amplified by a limiting amplifier 245 to be outputted as a second signal output 246. The receiving part can be a receiving node of a passive optical network. As long as the optical receiving power allows, there can be as many receiving nodes as can be.

Figure 2:
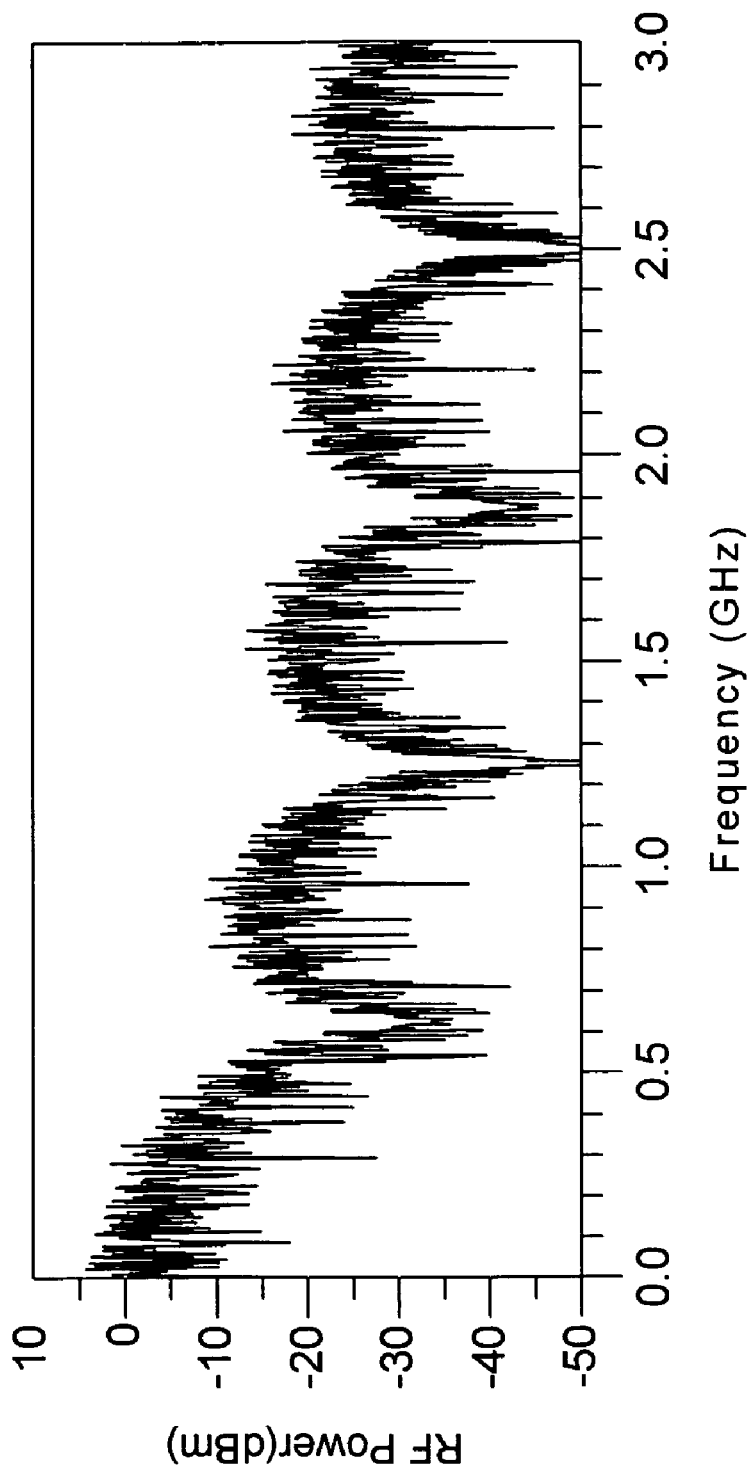
Figure 3A:
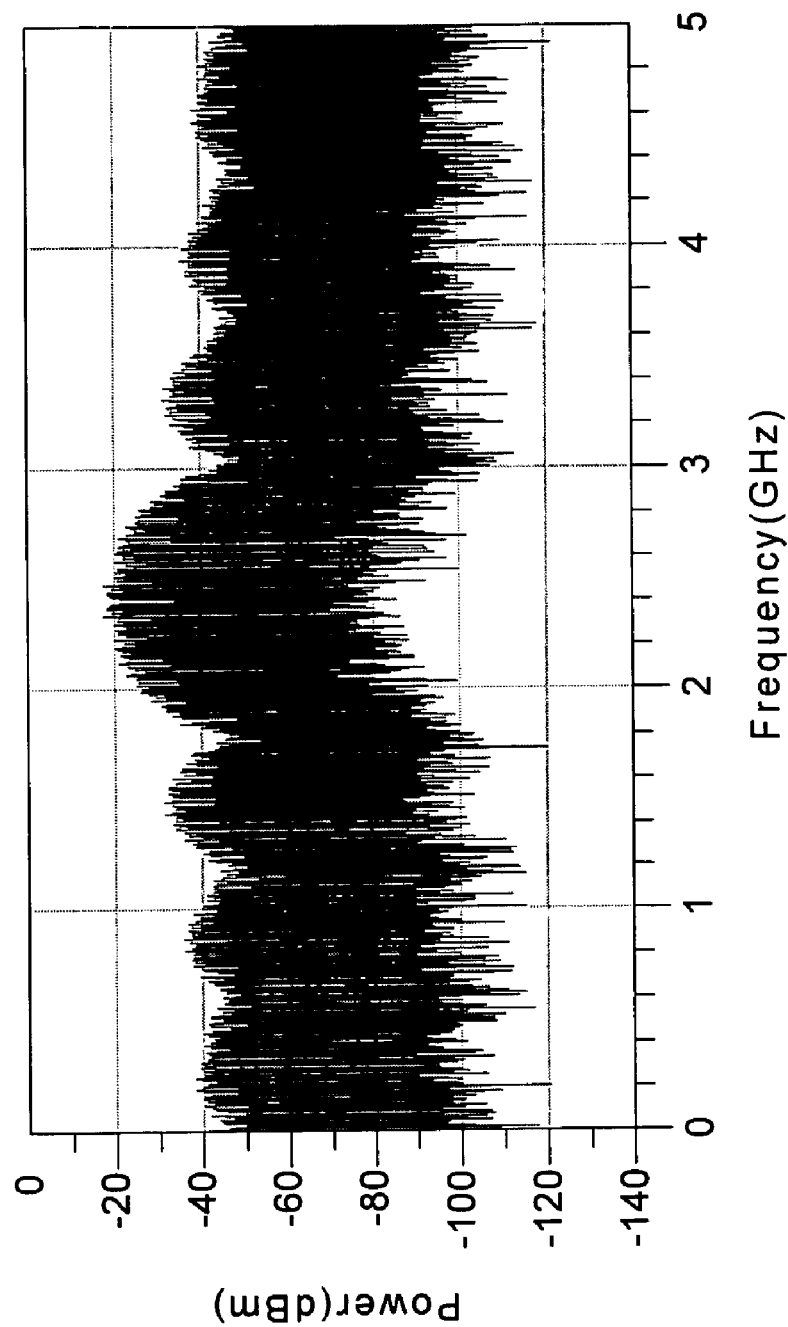
Figure 3B:
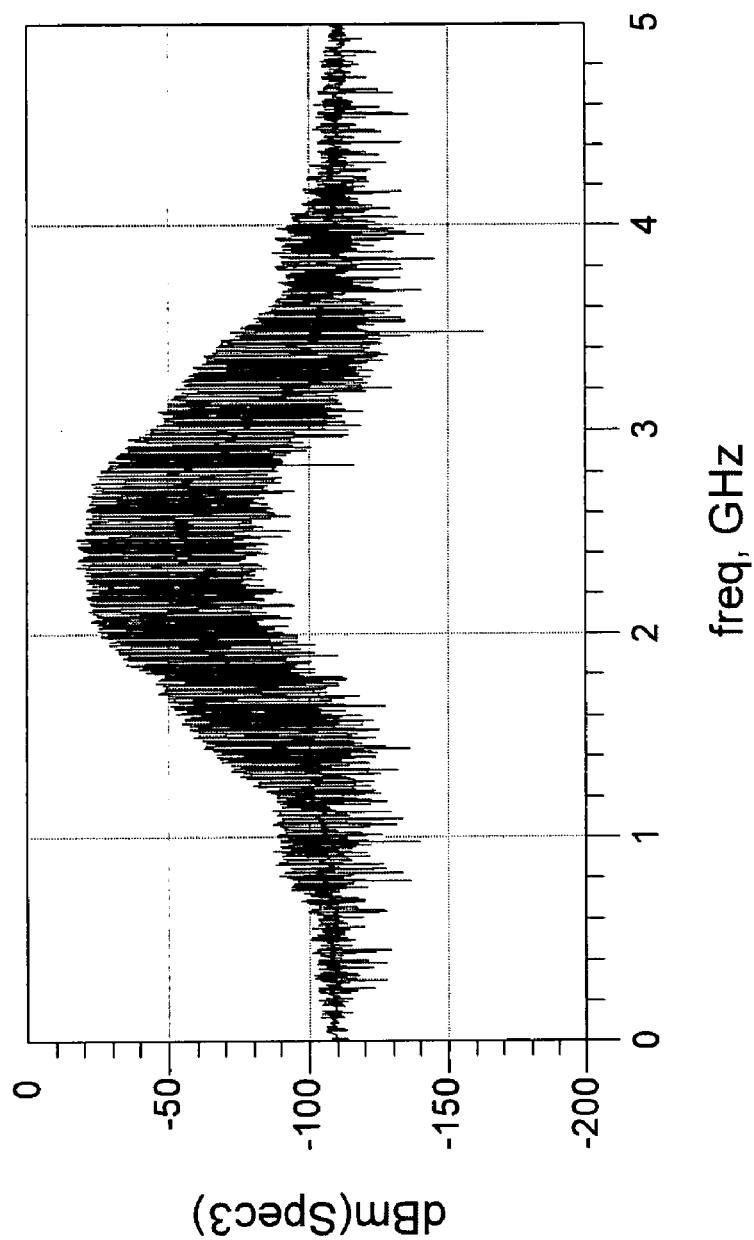
Figure 4A:
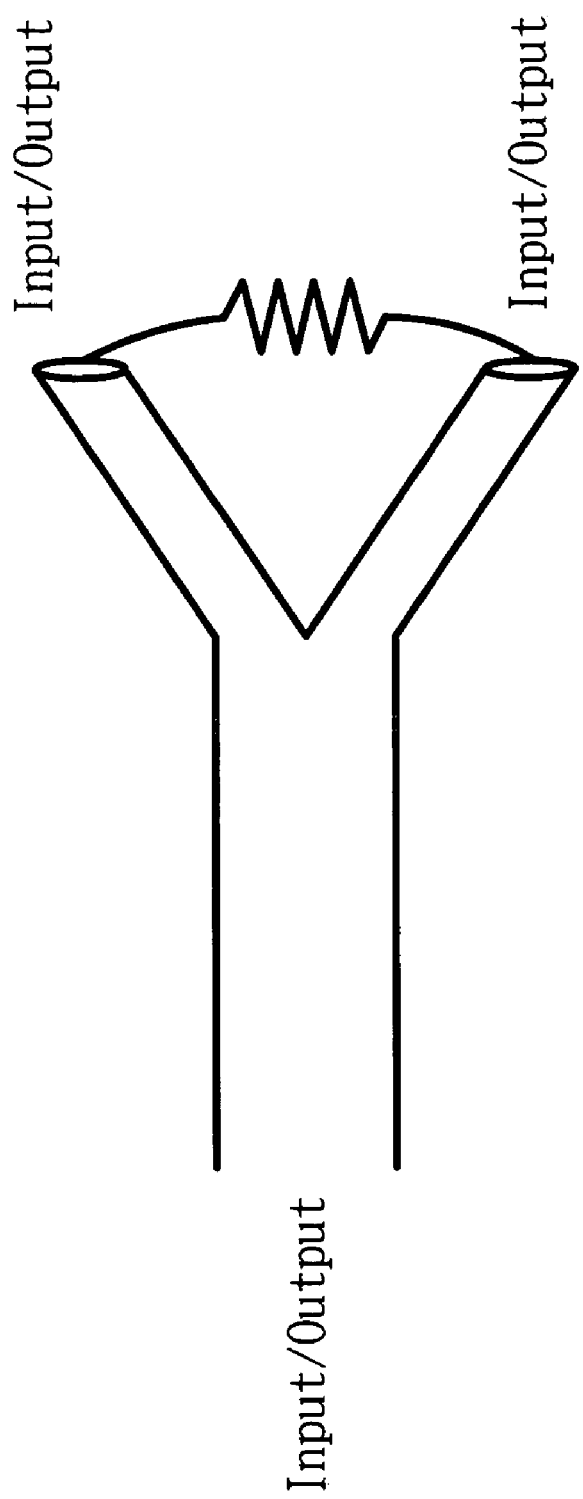
FIG. 4B is a view showing a 90° hybrid as a passive power combiner/divider according to an embodiment of the present invention.
FIG. 4C is a view showing a coupler as a passive power combiner/divider according to an embodiment of the present invention.
Figure 4B:
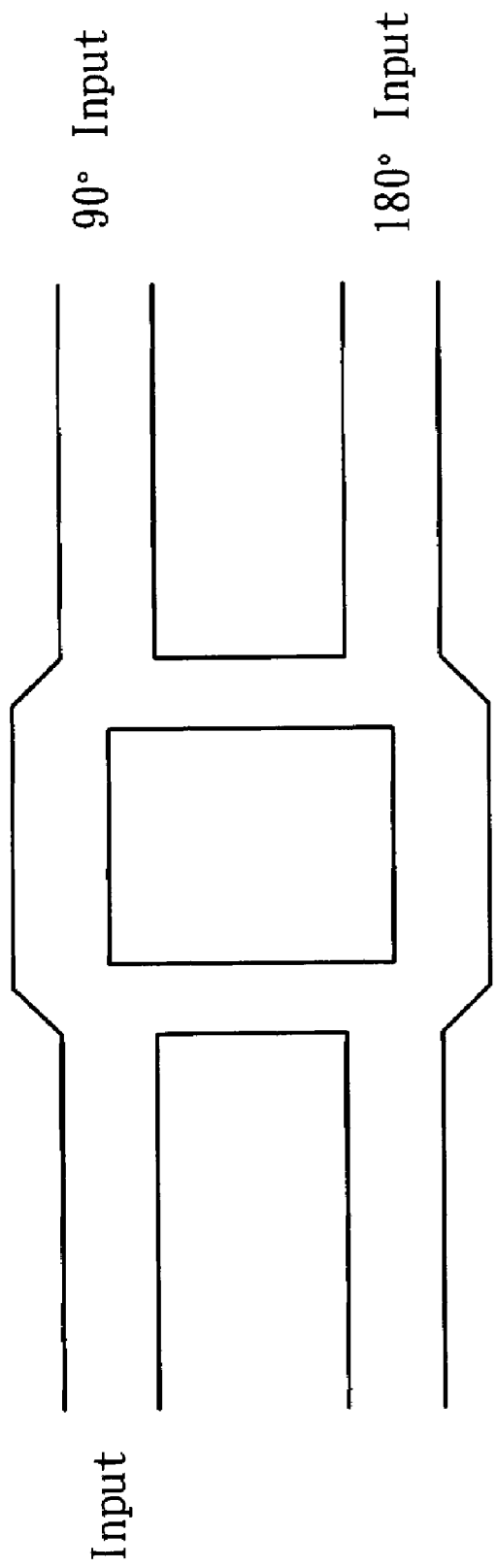
Figure 4C:
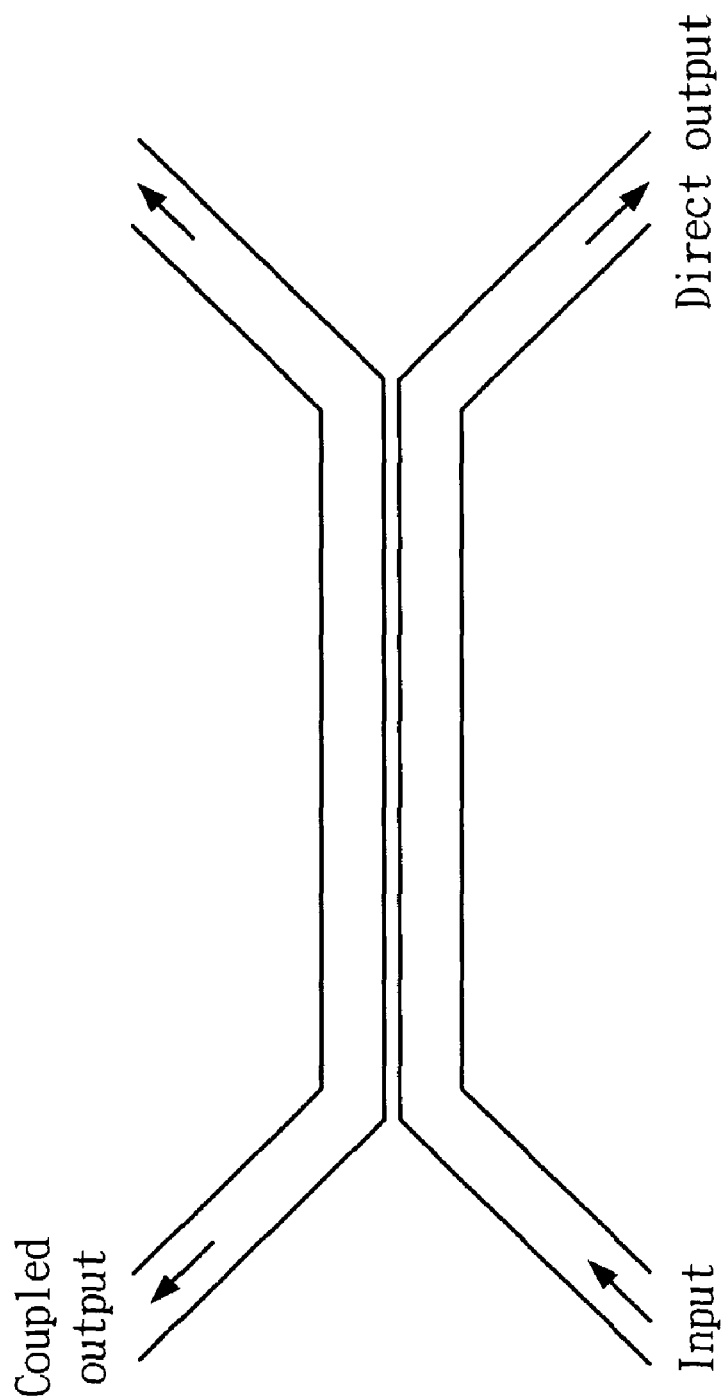
Figure 5:
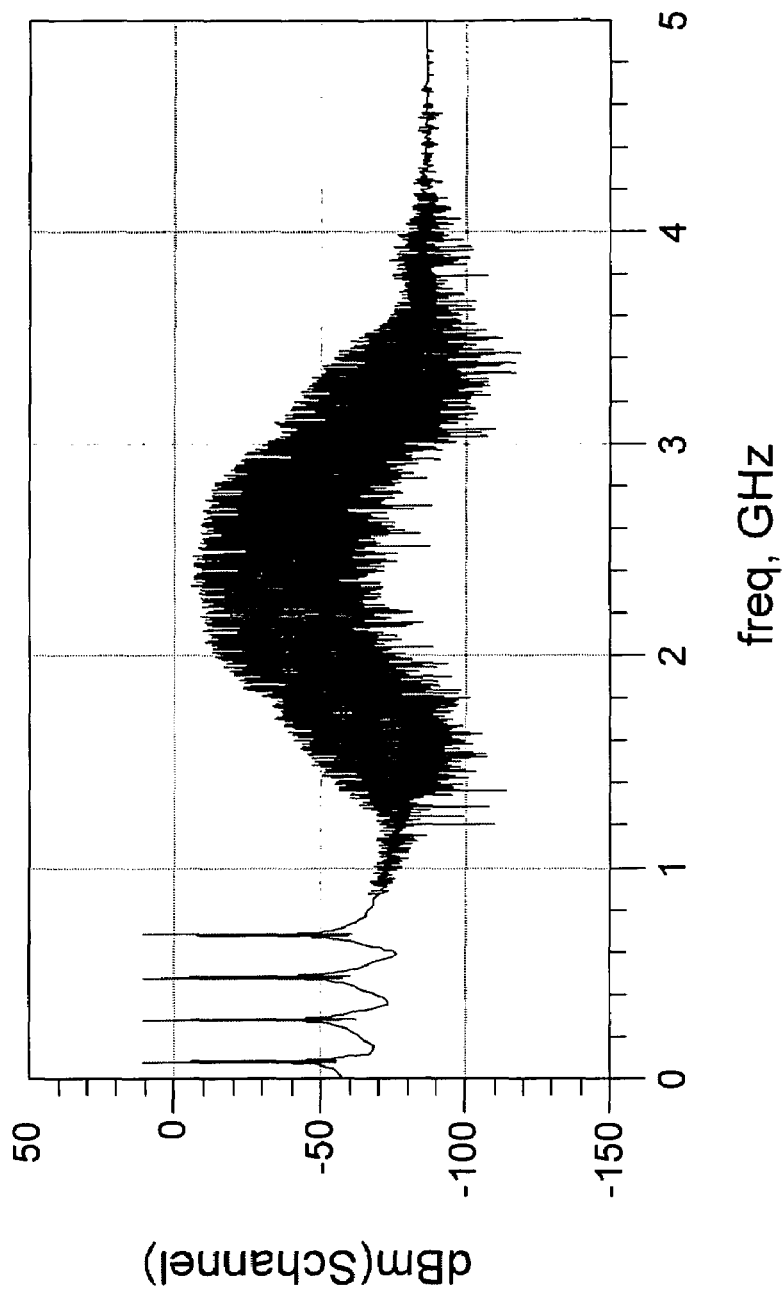
FIG. 5 is a view showing a mixed spectrum of CATV signals and Ethernet signals according to an embodiment of the present invention.
Figure 6A:
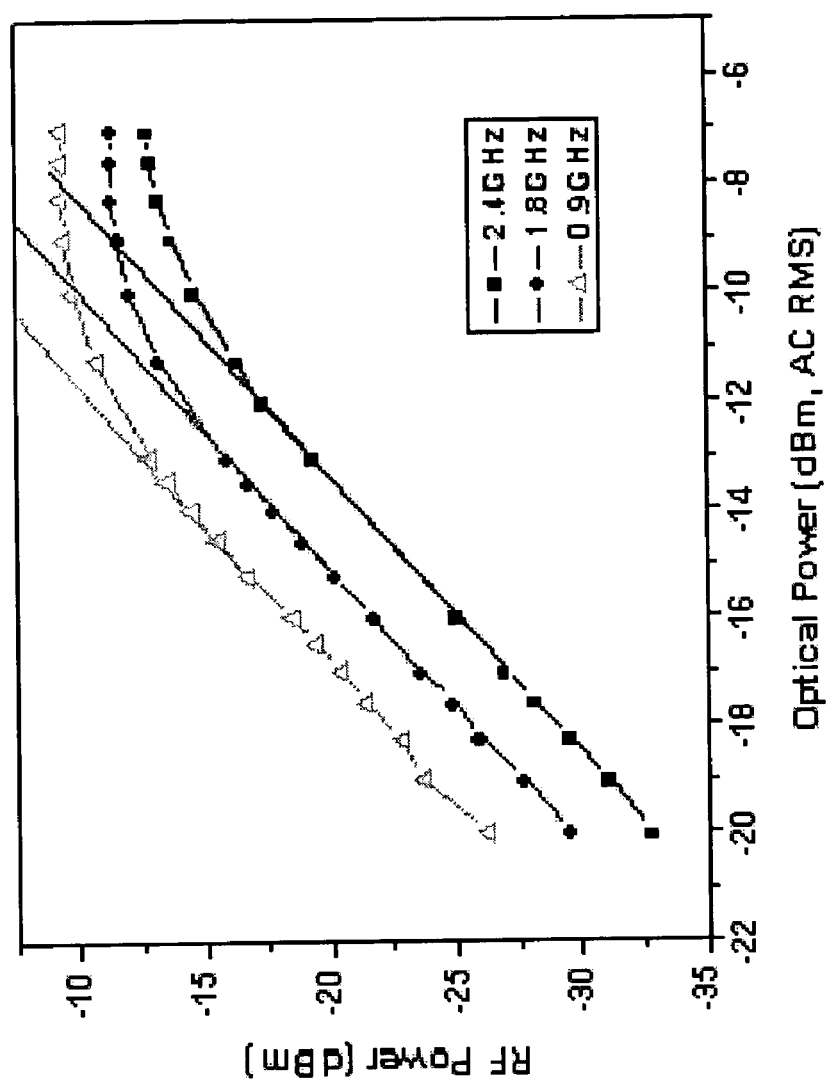
FIG. 6A is a view showing the saturation of an optoelectronic converter according to an embodiment of the present invention.
Figure 6B:
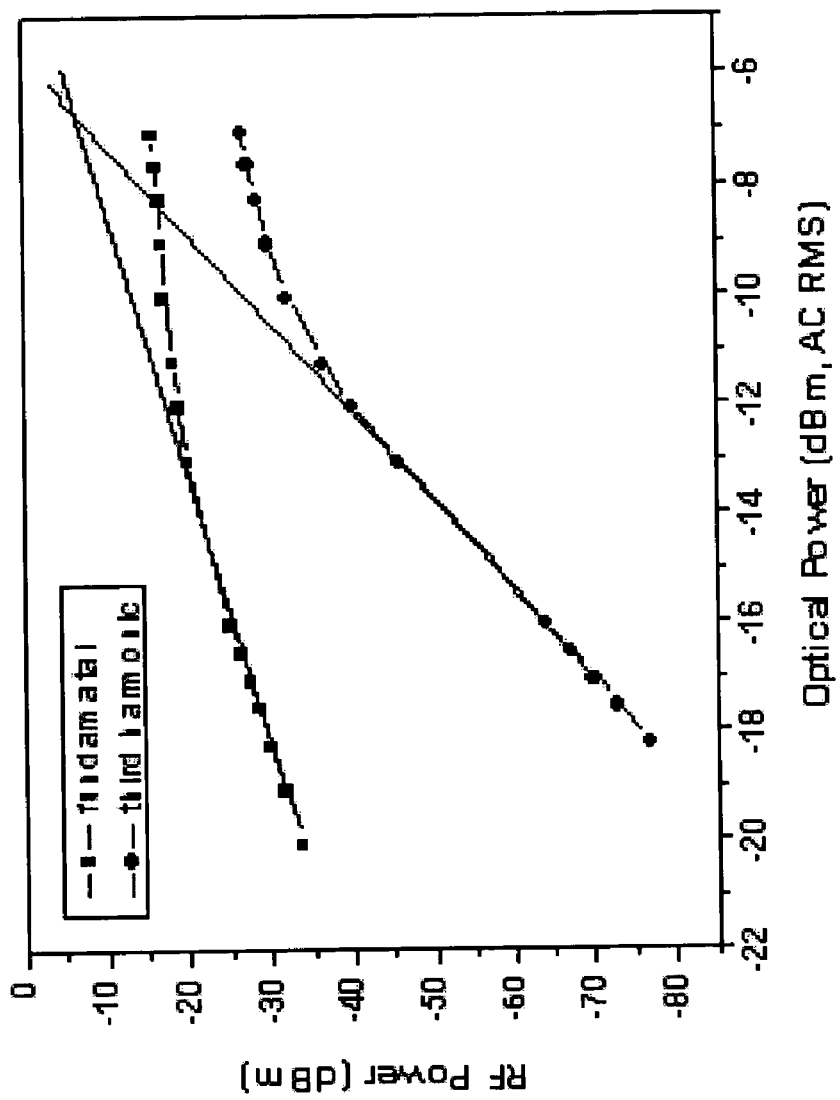
FIG. 6B is a view showing the linearity of an optoelectronic converter according to an embodiment of the present invention.
Figure 7A:
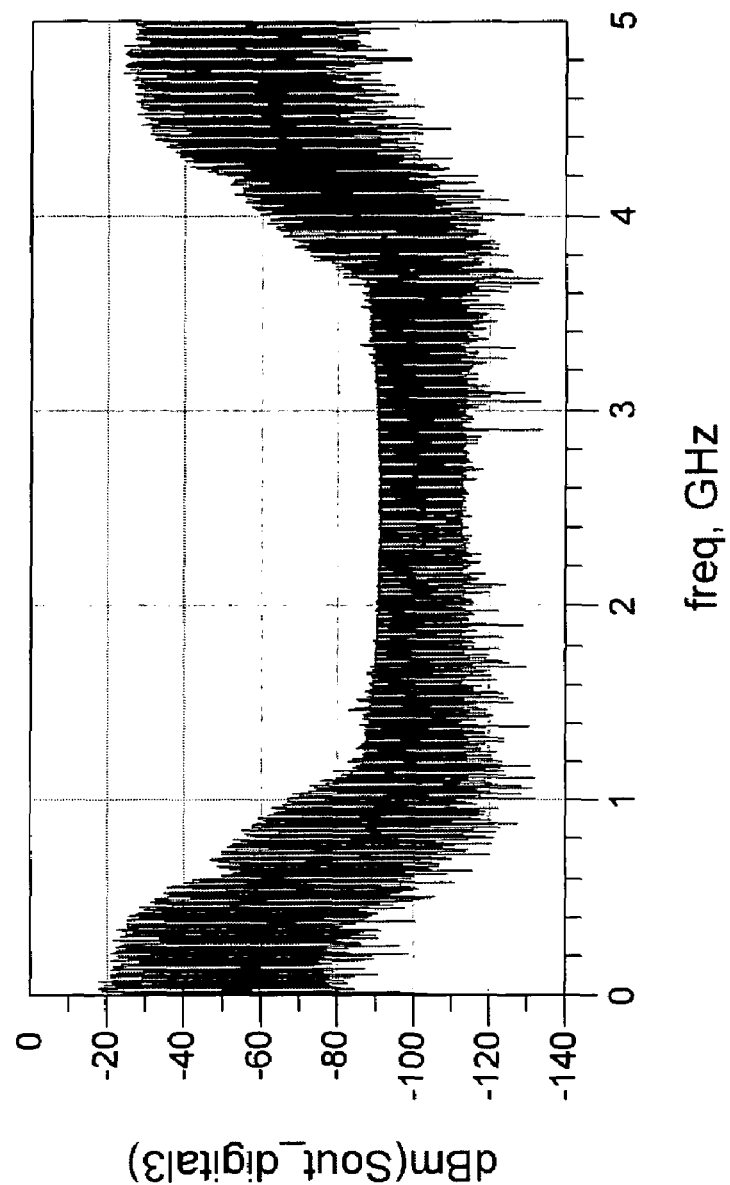
FIG. 7A is a spectrum diagram of down-converted digital/Ethernet signals before filtering according to an embodiment of the present invention.
Figure 7B:
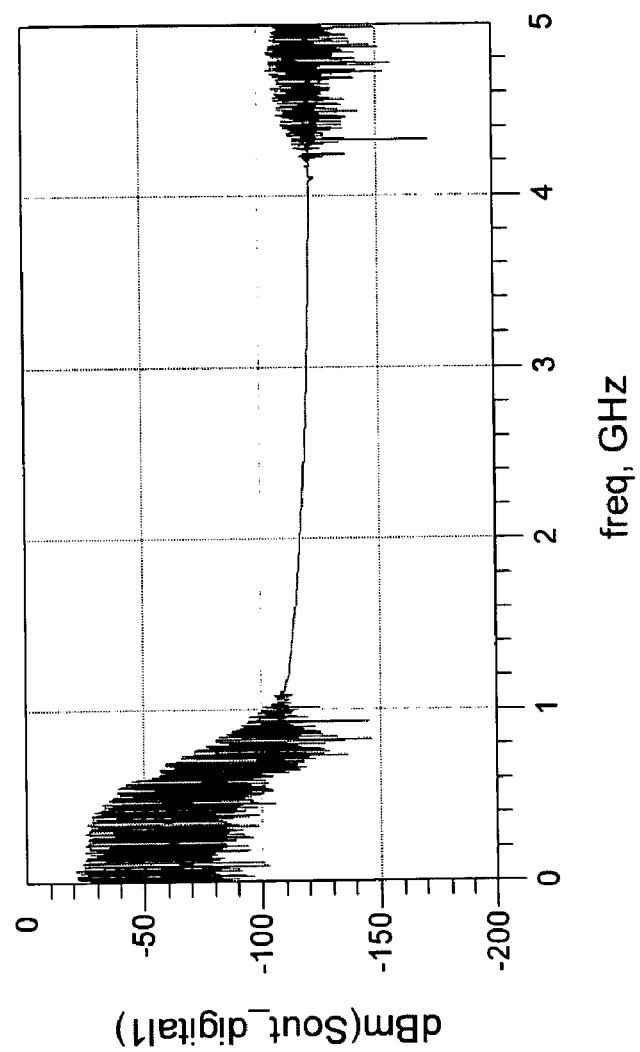
FIG. 7B is a spectrum diagram of down-converted digital/Ethernet signals after filtering according to an embodiment of the present invention.
Figure 8A:
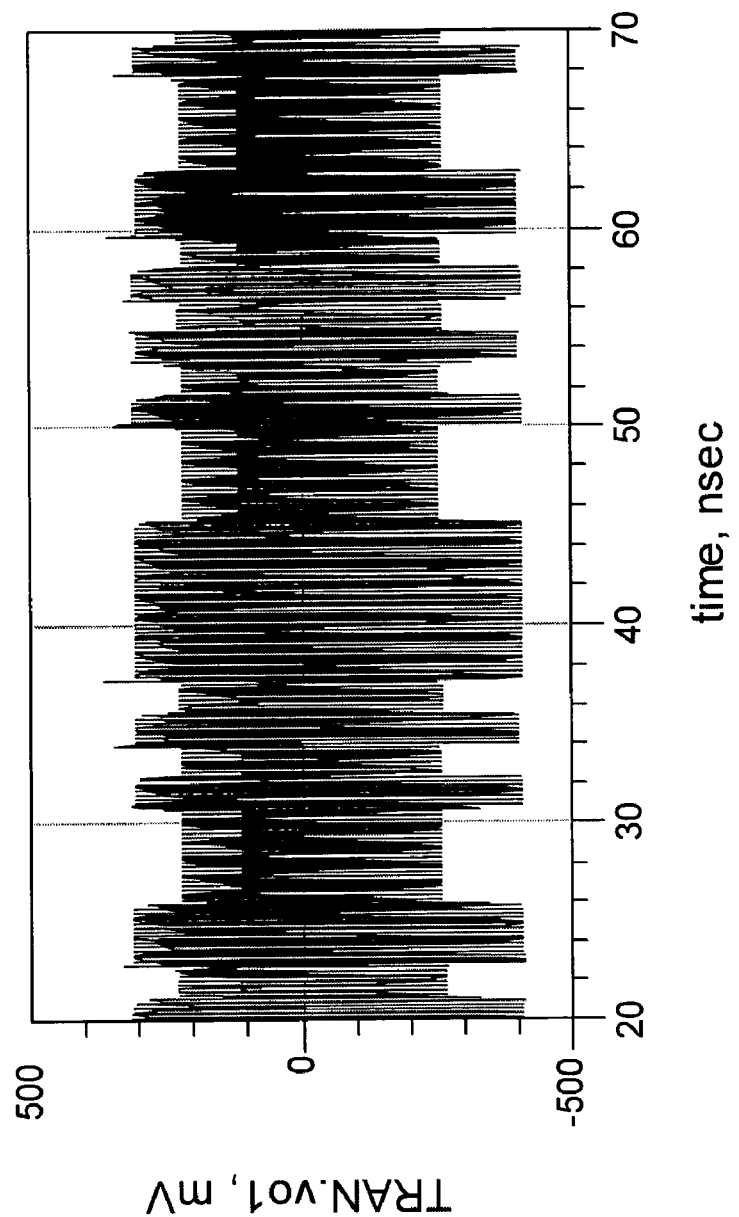
FIG. 8A is an oscillogram of down-converted digital/Ethernet signals before de-enveloping according to an embodiment of the present invention.
Figure 8B:
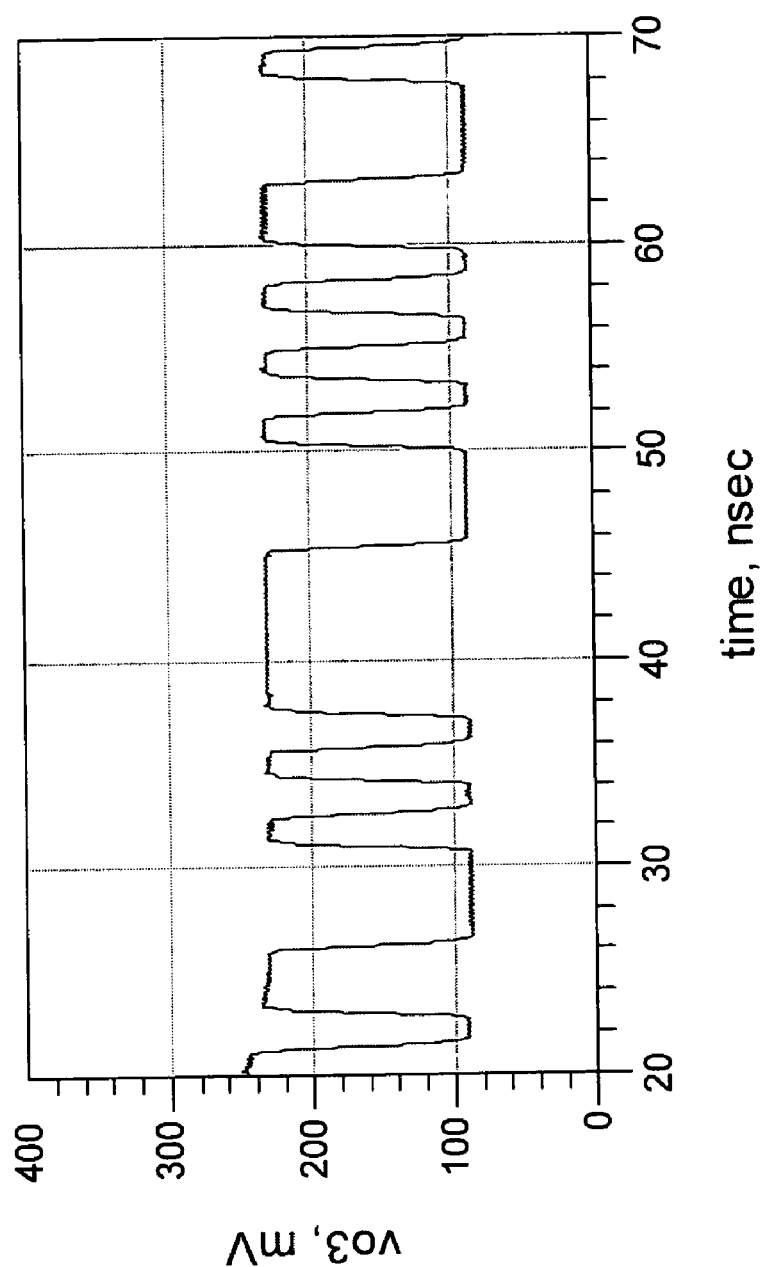
FIG. 8B is an oscillogram of down-converted digital/Ethernet signals after de-enveloping according to an embodiment of the present invention.
Figure 9A:
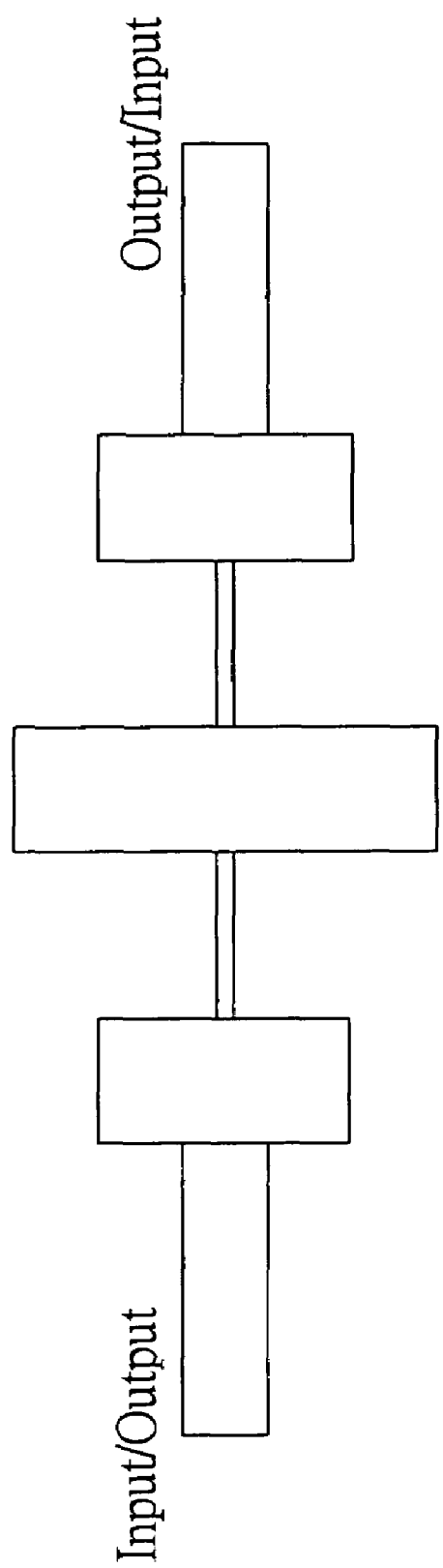
FIG. 9A is a frame view of a step-index low-pass filter according to an embodiment of the present invention.
Figure 9B:
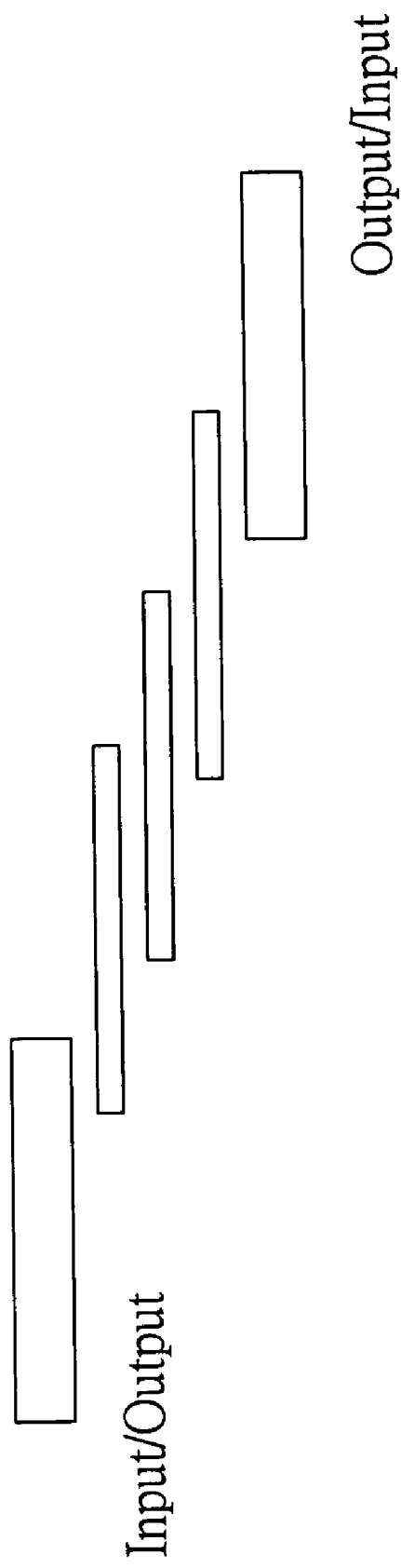
FIG. 9B is a frame view of a coupled band-pass filter according to an embodiment of the present invention.

Please further refer to FIG. 2 through FIG. 3B, which, according to an embodiment of the present invention, are a spectrum diagram of digital/Ethernet signals at a transmitter and up-converted spectrum diagrams of digital/Ethernet signals before and after filtering. As shown in the figures, the analog signals for the present invention have a working frequency between 50 MHz (mega-hertz) and 850 MHz, where each channel requires 6 MHz. And the digital signals for the present invention are transmitted under a circuit bandwidth of 10 Mb/s (mega-bit per second) to 10 Gb/s (giga-bit per second).

Take 622 Mb/s for example. The bandwidth where a digital signal occupies is from that of a DC (direct currency) to infinity. In order to be isolated from the analog signals, the digital signals are directly up-converted by the mixer for transmission 122 to be shifted to a certain carrier of a frequency of such as 1.8 GHz or 2.4 GHz, and so the frequency of the digital signals are extended in a range from the frequency of the certain carrier to infinity along a symmetric sinc function. And, the mixer 122 for transmission can be made of a WLAN (wireless local area network) circuit chip with a bandwidth of 1.8 GHz, 2.4 GHz or 5.2 GHz. Because the digital signals is directly converted by the mixer 122 for transmission and its bit-rate is higher than 100 Mb/s, the mixer 122 for transmission can be made of a wideband active mixer, a diode mixer or an RF switch which has a characteristic of wide band. And, because the power density of the signal spectrum under 0.75 times of the bit-rate occupies 95%, a band-pass filter 123 is used with only a limited distortion to the digital signals. Therein, a carrier is used as the center frequency of the band-pass filter 123, while the frequency of the band-pass filter 123 is extended to the higher and lower parts each having an amount of 0.75 times of the bit-rate, which means 466.5 MHz for each higher or lower part to form a total bandwidth of 933 MHz in 622 Mb/s; and while the deduction of the band-pass and band-stop is the greater the better. In this way, the high frequency part of the digital signals can be removed; besides, the digital signals can be distinguished from the analog signals.

Please further refer to FIG. 4A through FIG. 6B, which, according to an embodiment of the present invention, are views showing a Wilkinson power divider as a passive power divider/combiner, a 90° hybrid as a passive power divider/combiner, a coupler as a passive power divider/combiner, a mixed spectrum of CATV signals and Ethernet signals, the saturation of an optoelectronic converter and the linearity of an optoelectronic converter. As shown in the figures, the transmitting part 1 uses a passive power combiner or an active wideband analog adder as a power combiner 13 to combine separated digital signals and analog signals into mixed electrical signals. And, an amplifier 14 for transmission is deposited in the transmitting part 1 to adjust the level and the power of the mixed electrical signals. The amplifier 14 for transmission can be a constant gain amplifier or an auto gain control (AGC) amplifier. Then, the mixed electrical signals are transmitted to an electrical-to-optical converter to be converted to optical signals of a single wavelength and then are transmitted through the optical channel. Because the mixed electrical signals include analog signals, a circuit element with high linearity and low noise is required. The circuit element can be an externally modulated EO (electro-optic) modulator or a directly modulated laser driver together with a semiconductor laser diode so that the CTB (composite triple beat) and the CSO (composite second-order) of the channels, which are between 50 MHz and 900 MHz can be above the standard required 62 dB and its noise rate, can be above 48 dB. Meanwhile, by controlling the outputted optical power to be around 0 dBm, the nonlinear effect of the optical fiber under high optical power, and the insufficient signal power of the receiving part 2 caused by low optical power, both can be prevented.

The optical signals of a single wavelength are received from the optical channel 3 into the receiving part 2 to be converted into electrical signals by the optical-to-electrical converter. The optical-to-electrical converter 21 comprises an optical diode (such as a PIN-type diode, an avalanche photodiode or a metal-semiconductor-metal diode) and a transimpedance amplifier to amplify converted electrical signals. The optical-to-electrical converter 21 is operated under a carrier with a bandwidth of 1.8 GHz, whose bit-rate is 622 Mb/s; and, the valid power spectrum of the signals ranges from 1.2 GHz to 2.4 GHz. The proper range of the wavelength for the operation of the optical diode in the optical-to-electrical converter 21 is decided according the emission wavelength of the transmitting part. And, the transimpedance amplifier of the optical-to-electrical converter 21 have to use a circuit having high input saturation current and high linearity so that the distortion of the analog signals can be minimized. After the mixed electrical signals are outputted from the transimpedance amplifier, through a passive power divider or a power divider 22 which is identical to that of the transmitting part yet is reversely used, the mixed electrical signals are divided up to be transmitted in two paths; and, one path is to transmit digital signals, and the other one, analog signals.

The analog signals are transmitted to a low-pass filter 232 for receipt whose 3 dB cutoff frequency is is 900 MHz so that the interference from the digital signals can be avoided. Then, the low-pass filter 232 for receipt is connected to a signal amplifier 233 so that the analog signals are amplified, and are transmitted to a first signal output 234. The signal amplifier 233 whose bandwidth is between 50 MHz to 850 MHz is to compensate the signal loss made by the optical-to-electrical converter 21, the power divider 22 and the low-pass filter for receipt 232. The passive power combiner or the power divider is made on a printed circuit board according to the transmission line theory. By using a carrier obtained by up/down-converted digital signals as the center frequency, signals can be combined or divided by the combiner/divider depending on its direction. And, the combiner/divider can be a Wilkinson power divider, a 90° hybrid or a coupler.

Please further refer to FIG. 7A through FIG. 9B, which, according to an embodiment of the present invention, are spectrum diagrams of down-converted digital/Ethernet signals before and after filtering, oscillograms of down-converted digital/Ethernet signals before and after un-enveloping, a frame view of a stepping low-pass filter and a frame view of a coupling band-pass filter. As shown in the figures, the digital signals are transmitted to a high-pass filter 242 whose 3 dB cutoff frequency is 900 MHz so that the interference from the analog signals can be isolated. The digital signals are then directly down-converted with a down-converter carrier 247 of 1.8 GHz or 2.4 GHz through a mixer 243 for receipt to obtain enveloped signals with a mixed frequency. And then, the digital signals are transmitted to a low-pass filter 244 for un-enveloping whose cutoff frequency is the same to the bit-rate of the digital signals as 3 dB so that the original non-enveloped digital signals of the transmitting part which are not up-converted can be obtained through the un-enveloping. After obtaining the non-pocketed digital signals, the limiting amplifier is connected to amplify the digital signals to a level which the digital signal process circuit of the back-end allows. The filters of the present invention, such as the filters for transmission/receipt, the band-pass filter, the high-pass filter and the filter for un-enveloping, can be made of SMDs (surface mounted device), stepping/coupling transmission lines or mixing transmission lines made of SMD.

Nevertheless, the signals for the first and the second signal transmitters can be analog/CATV signals under a working frequency between 50 MHz and 850 MHz or digital/Ethernet signals with a bandwidth above 10 Mb/s; and, the signals from the first and the second signal outputs can be analog/CATV signals or digital/Ethernet signals.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. An optical fiber system for carrying both CATV (cable television) and Ethernet signals, comprising: a transmitting part, an optical channel and a receiving part, said transmitting part comprising:
(1) a first signal transmitter;
(2) a second signal transmitter comprising a transmitting signal source, a radio-frequency carrier, a mixer for transmission and a band-pass filter; and
(3) a combiner amplifier, said receiving part comprising:
(1) a receiver divider;
(2) a first receiver; and
(3) a second receiver comprising a receiving signal source, a high-pass filter, a down-converter carrier, a mixer for receipt, a low-pass filter, a limiting amplifier and a signal output, wherein, by said combiner amplifier,
(1) a signal from said first signal transmitter and a signal from said second signal transmitter are combined to form a mixed signal comprising at least one analog signal and at least one digital signal;

(2) said mixed signal is adjusted in level and power; and (3) said mixed signal is modulated into an optical signal;

wherein, by said receiver divider, said optical signal is divided into a signal for a first receiver and a signal for a second receiver; and wherein said transmitting part is connected to said receiving part by said optical channel.

2. The optical fiber system according to claim 1, wherein a signal for said first signal transmitter and a signal for said second signal transmitter are selected from a group consisting of an analog/CATV signal under a working frequency between 50 MHZ (mega-hertz) and 850 MHZ and a digital/Ethernet signal with a bandwidth above 10 Mb/s (mega-bit per second).

3. The optical fiber system according to claim 1, wherein the signal from said first signal output and the signal from said second signal output are selected from a group consisting of an analog/CATV signal and a digital/Ethernet signal.

4. The optical fiber system according to claim 1, wherein said mixer for transmission is a WLAN (wireless local area network) circuit chip with a bandwidth of which is selected from a group consisting of 1.8 GHz (giga-hertz), 2.4 GHz, and 5.2 GHz.

5. The optical fiber system according to claim 1, wherein said mixer for transmission is selected from a group consisting of a wideband active mixer, a wideband diode mixer, and a radio frequency switch which has a characteristic of high bandwidth.

6. The optical fiber system according to claim 1, wherein said band-pass filter is selected from a group consisting of an SMD (surface mounted device), a stepping transmission line, a coupling transmission line, and a mixing transmission line made of SMD.

7. The optical fiber system according to claim 1, wherein said optical channel is selected from a group consisting of a glass fiber, a plastic fiber and a free space.

8. A method for carrying both CATV and Ethernet signals over an optical fiber system, which comprises the steps of:

(A) in a transmitting part, (1) transmitting a signal of a first signal source to a low-pass filter for transmission and then transmitting the signal of the first signal source to a power combiner;

(2) up-converting a signal of a second signal source is utilizing a mixer for transmission and then transmitting the signal of the second signal source to a band-pass filter and then transmitting the signal of the second signal source to said power combiner;

(3) combining said signal of said first signal source and said signal of said second signal source utilizing said power combiner to form a mixed electrical signal comprising at least one analog signal and at least one digital signal;

(4) modulating the level and the power of said mixed electrical signal utilizing an amplifier for transmission; and (5) converting said mixed electrical signal into an optical signal utilizing an electrical-to-optical converter, and (B) transmitting said optical signal utilizing an optical channel, and, (C) in a receiving part, (1) receiving said optical signal from said optical channel and converting said optical signal into said mixed electrical signal utilizing an optical-to-electrical converter;

(2) utilizing a power divider, dividing said mixed electrical signal into a signal of a third signal source and a signal of a fourth signal source;

(3) transmitting said signal of said third signal source to a low-pass filter for receipt to be transmitted to a signal amplifier and then outputting said signal of said third signal source as a first signal output; and (4) transmitting said signal of said fourth signal source to a high-pass filter and subsequently to a mixer for receipt so as to be down-converted into an enveloped signal, and said enveloped signal is unenveloped into a non-enveloped signal through a low-pass filter for unenveloping, and said non-enveloped signal is amplified by a limiting amplifier to be outputted as a second signal output.

9. The method according to claim 8, wherein said signal of said first signal source and said signal of said second signal source are selected from a group consisting of an analog/CATV signal under a working frequency between 50 MHZ and 850 MHZ and a digital/Ethernet signal with a bandwidth above 10 Mb/s.

10. The method according to claim 8, wherein said first signal output and said second signal output are selected from a group consisting of an analog/CATV signal and a digital/Ethernet signal.

11. The method according to claim 8, wherein said mixer for transmission is a WLAN circuit chip with a bandwidth of which is selected from a group consisting of 1.8 GHz, 2.4 GHz, and 5.2 GHz.

12. The method according to claim 8, wherein said mixer for transmission is selected from a group consisting of a wideband active mixer, a wideband diode mixer and a radio frequency switch which has a characteristic of high bandwidth.

13. The method according to claim 8, wherein said low-pass filter for transmission, said band-pass filter, said low-pass filter for receipt, said high-pass filter, and said low-pass filter for unpacking are selected from a group consisting of an SMD, a stepping transmission line, a coupling transmission line, and a mixing transmission line/SMD type.

14. The method according to claim 8, wherein said power combiner and said power divider are selected from a group consisting of a passive power combiner/divider and an active wideband analog adder.

15. The method according to claim 14, wherein said passive power combiner/divider is selected from a group consisting of a Wilkinson power divider, a 90 degree hybrid, and a coupler.

16. The method according to claim 8, wherein said amplifier for transmission is selected from a group consisting of a fixed gain amplifier and an auto gain control amplifier.

17. The method according to claim 8, wherein said electrical-to-optical converter comprises an externally modulated EO (electro-optic) modulator and a semiconductor laser diode.

18. The method according to claim 8, wherein said electrical-to-optical converter comprises an externally and directly modulated laser driver and a semiconductor laser diode.

19. The method according to claim 8, wherein said optical-to-electrical converter comprises an optical diode and a transimpedance amplifier.

20. The method according to claim 19, wherein said optical diode is selected from a group consisting of a PIN-type photodiode, an avalanche photodiode and a metal-semiconductor-metal diode.

21. The method according to claim 8, wherein the bandwidth of said signal amplifier is between 50 MHZ and 850 MHZ.

22. The method according to claim 8, wherein said receiving part is a receiving node of a passive optical network.

23. The method according to claim 8, wherein said optical channel is selected from a group consisting of a glass fiber, a plastic fiber, and a free space.

* * * * *